Figure 1:
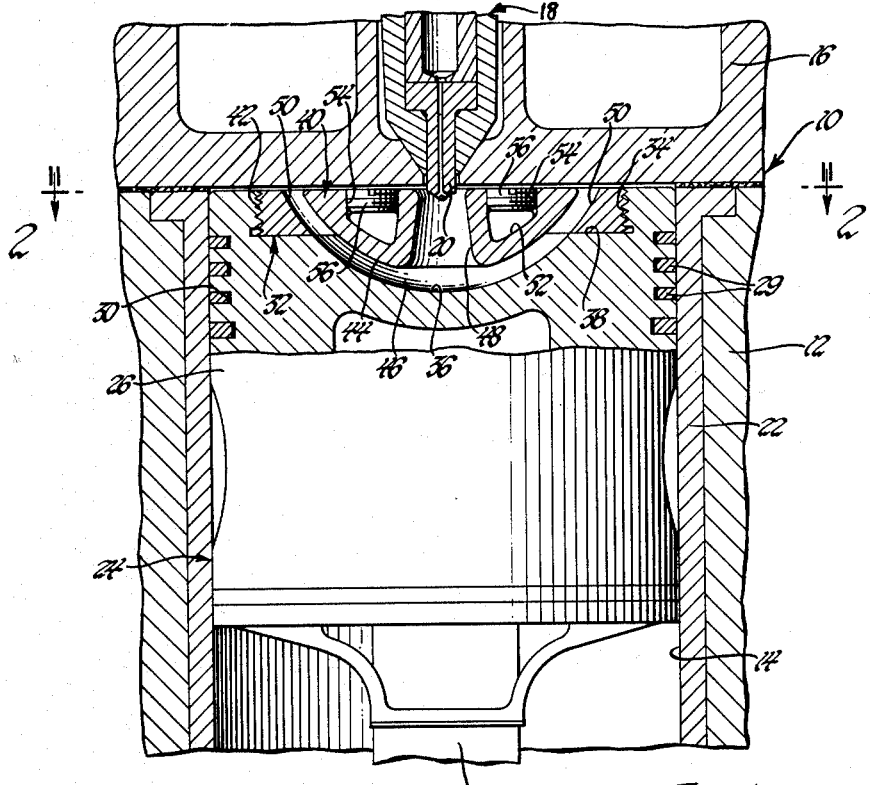

May 12, 1964 J. ZIMMERMAN 3,132,633

PISTON ASSEMBLY

Filed April 11, 1963

INVENTOR.
John Zimmerman
BY
George A. Schmidt
ATTORNEY

United States Patent Office 3,132,633
Patented May 12, 1964

3,132,633
PISTON ASSEMBLY
John Zimmerman, Grosse Pointe Woods, Mich., assignor to General Motors Corporation, Detroit, Mich., a corporation of Delaware
Filed Apr. 11, 1963, Ser. No. 272,267
9 Claims. (Cl. 123—32)

This invention relates to pistons, and more particularly to a piston assembly for an internal combustion engine and provided with a precombustion chamber to increase the efficiency of the combustion process of the engine.

In many internal combustion engines, and particularly engines provided with fuel injection systems, it is often desirable to provide a precombustion chamber of some kind adjacent the main combustion chamber of the engine. Generally speaking, the precombustion chamber is formed in the engine for the purposes of increasing turbulence and fuel distribution. Typical of this construction is a piston in the general form of a conventional piston but with a large depression formed in the upper surface to form a precombustion chamber with the cylinder head. With such a construction the usual result is non-uniform fuel distribution, inefficient combustion, noisy operation and retention of residual gases following the combustion process.

The device in which this invention is embodied comprises, generally, a piston receivable in the usual engine cylinder and having an insert member in the upper portion thereof. The piston head is provided with a concave indentation into which the insert is placed. The bottom surface of the insert has a convex surface which is complementary to and spaced from the concave indentation in the piston to provide a bowl-shaped precombustion chamber. A central opening through the insert member is aligned with the fuel injection means and opens directly into the precombustion chamber. Leading from the precombustion chamber and to the main cylinder combustion chamber is an annulus of orifices, the orifices being radially spaced around the central opening. Upon injection of fuel into the precombustion chamber, atomization and partial combustion occurs in the precombustion chamber at the proper time, forcing the remaining air-fuel charge through the orifices and into the main combustion chamber under high turbulence and high velocity.

This type of construction provides greater activation of the gases in the main cylinder combustion chamber to promote better burning for the power stroke of the piston. Unburned fuel is distributed more uniformly throughout the main combustion chamber due to the turbulence provided by the piston construction. Since there is more even fuel burning, the operation of the engine will be quieter, and also better valve arrangements in the cylinder head of the engine are permissible. Because of the large outlet area provided by combining the orifice areas, better ventilation is provided causing the elimination of residual gases in the precombustion chamber after combustion.

Figure 2:
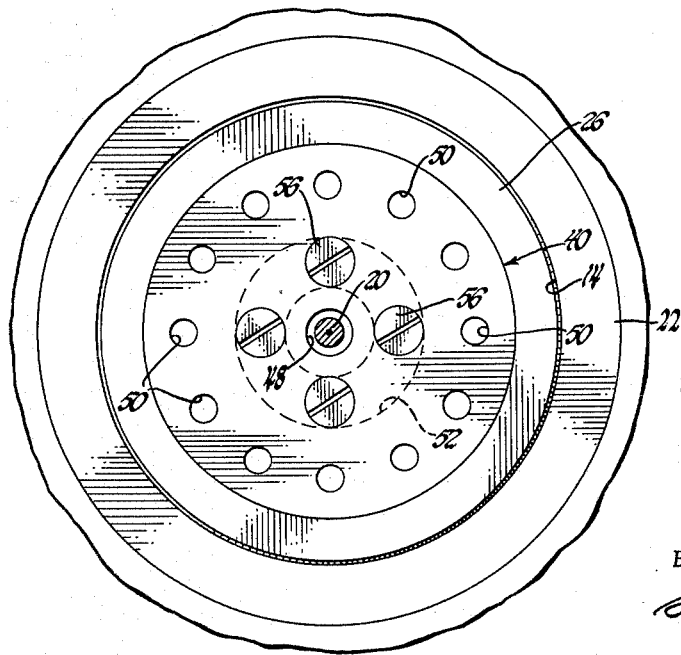

These and other advantages will become more apparent from the following description and drawing, in which:

FIGURE 1 is a cross-sectional view of a portion of an internal combustion engine, illustrating the piston assembly in which this invention is embodied; and FIGURE 2 is a plan view of the piston assembly illustrated in FIGURE 1, taken substantially along the line 2—2 of FIGURE 1 and looking in the direction of the arrows.

Referring more particularly to the drawing, FIGURE 1 best illustrates the general environment in which the piston assembly is utilized. A typical internal combustion engine is illustrated generally by the numeral 10 and is shown to include an engine block 12 containing the usual cylinder 14. A cylinder head 16 is located above the engine block 12 and may contain the usual valving mechanism and the fuel induction system. In the example illustrated in the drawing, a fuel injection system is utilized wherein an injector, illustrated generally by the numeral 18, is suitably received and secured in the cylinder head 16 and terminates in an injector nozzle 20 extending into the engine cylinder 14. The fuel enters the cylinder 14 from the nozzle 20 and suitable conduits and other passages, not shown, are provided for conveying the fuel to the nozzle 20. Air is supplied to be mixed with the fuel for proper combustion, the air entering the cylinder 14 from any suitable source. The cylinder may be provided with a cylinder liner 22, if desired, although this is not necessary to the operation of the invention.

Reciprocably received in the cylinder 14 is a piston assembly, illustrated generally by the numeral 24. Piston 24 includes a piston head 26 and a piston connecting rod 28, the connecting rod being secured to the usual crankshaft, not shown, for operating the engine. Piston rings 29 are provided in suitable grooves 30 formed in the outer cylindrical surface of the piston head 26.

As illustrated in FIGURE 1, the upper portion of the piston head 26 is provided with a stepped indentation, illustrated generally by the numeral 32. This indentation includes a cylindrical portion 34 and a concave portion 36. This concave portion may be of any suitable shape, although it is preferred that it be spherical for most efficient operation. The cylindrical and concave portions are separated by a shoulder 38.

Secured in the upper portion of piston head 26 is an insert member, illustrated generally by the numeral 40. Insert member 40 is provided with a threaded cylindrical portion 42 which is received in the cylindrical portion 34 of the indentation in the piston head 26, the insert seating on the shoulder 38 in the piston head. Insert 40 is also provided with a convex lower surface 44 which is generally complementary to and is spaced from the concave indentation 36 in the piston head 26. The resultant bowl-shaped space 46 between the concave indentation 36 and the convex surface 44 is the precombustion chamber. Insert 40 is further provided with a central opening 48 extending from the upper surface of the piston assembly to the precombustion chamber 46 and which is in axial alignment with the injector nozzle 20. Central opening 48 may be tapered outwardly and downwardly, as illustrated in FIGURE 1, if desired, for better fuel-air charge flow.

In the cylindrical portion 42 of the insert 40 a plurality of orifices 50 are provided which communicate between the main combustion chamber in the cylinder 14 and the precombustion chamber 46. The orifices 50 are radially spaced from the central opening 48 and, as illustrated in FIGURE 1, may be curved in the planes containing the axis of the piston assembly. This continues the concave contour of the indentation 36 in the piston head 26 and provides proper flow from the precombustion chamber to the main combustion chamber.

Surrounding the central opening 48 in the insert 40 an annular chamber 52 may be provided. Chamber 52 may be formed in any suitable manner, such as by coring the casting from which the insert 40 is made. Holes 54 are provided through which the core material may be removed, the holes being plugged by threaded members 56 after the core is removed. The purpose for the space 52 is to provide means for lightening the piston assembly.

The operation of the piston assembly and precombustion chamber is as follows. During the compression stroke of the engine, that is, when the piston is moving upwardly in the cylinder and the air ahead of the piston is being compressed, the air in the cylinder 14 enters the precombustion chamber and fills all of the openings therein. Near the top of the compression stroke, fuel is injected by the injector nozzle 20 into the central opening 48 of the insert 40. The fuel impinges on the hot concave surface 36 of the piston head 26 where it atomizes. At this instant ignition occurs within the precombustion chamber 46, which is noted as being a relatively narrow space. As the air-fuel charge ignites there is a rapid expansion due to the combustion, forcing air and unburned fuel into and through the plurality of orifices 50 at high velocity causing turbulence and further combustion in the main combustion chamber. Hot gases are also forced back through the central opening 48 at the moment of ignition against the incoming remaining fuel from the injector nozzle 20. This fuel is thus forced back while being atomized by the hot gases and dispersed over the top of the piston and insert into the main combustion chamber. Combustion continues in the main combustion chamber forcing the piston downward on its driving stroke.

Thus, a piston assembly is provided with a precombustion chamber and a series of orifices from the precombustion chamber to provide greater turbulence in the main combustion chamber during the firing cycle. The turbulence provides uniform combustion because of more equal distribution of unburned fuel throughout the main combustion chamber. This, in turn, causes quieter operation of the engine and greater efficiency in the operation of the engine.

What is claimed is:

1. A piston assembly for an internal combustion engine having a fuel injection system and an injector nozzle and comprising:
    a piston head reciprocable in said engine and having a spherical indentation in the upper surface thereof;
    and an insert secured in said indentation in said piston head and having a convex surface adjacent said indentation to form with said indentation a bowl-shaped precombustion chamber, said insert having a central opening therethrough aligned with said injector nozzle and communicating with said precombustion chamber to convey a combustible mixture thereto for partial combustion therein, said insert having a plurality of orifices radially spaced from said central opening and communicating between said precombustion chamber and the upper surface of said piston head to convey said combustible mixture from said precombustion chamber.

2. The piston assembly set forth in claim 1 wherein said orifices in said insert are arcuate in the plane containing the axis of said piston.

3. The piston assembly set forth in claim 1 wherein said central opening in said insert tapers outwardly from the top surface thereof toward said precombustion chamber.

4. A piston assembly for an internal combustion engine having a combustion chamber and fuel injection nozzle and comprising:
    a piston head reciprocable in said engine and in said combustion chamber, said piston head having a concave indentation in the upper surface thereof;
    and an insert secured in said upper surface of said piston head and having a convex lower surface generally complementary to and spaced from said concave indentation to form a bowl-shaped precombustion chamber within said piston head, said insert having a central opening therethrough aligned with said fuel injection nozzle and opening into said precombustion chamber to convey a combustible mixture to said precombustion chamber for partial combustion therein, and said insert having a plurality of orifices radially spaced from said central opening and communicating between said precombustion chamber and said combustion chamber for conveying the combustible mixture to said combustion chamber for greater combustion promoting activation of said combustible mixture in said combustion chamber.

5. The piston assembly set forth in claim 4 wherein said orifices in said insert are arcuate in the plane containing the axis of said piston.

6. The piston assembly set forth in claim 4 wherein said central opening in said insert tapers outwardly from the top surface thereof toward said precombustion chamber.

7. A piston assembly for an internal combustion engine having a combustion chamber and a fuel injection orifice and comprising:
    a piston head reciprocable in said engine and in said combustion chamber, said piston head having a concave indentation in the upper portion thereof;
    and an insert secured in the upper portion of said piston head and having an upper surface in the plane of the upper surface of said piston head, said insert having a convex lower surface complementary to and spaced from said concave indentation in said piston head to form a bowl-shaped precombustion chamber in said upper portion of said piston head, said insert having a central opening therethrough aligned with said fuel injection nozzle and opening into said precombustion chamber to convey a combustible mixture to said precombustion chamber for partial combustion therein, said insert having an annulus of orifices radially spaced from said central opening and communicating between said precombustion chamber and said combustion chamber to convey the combustible mixture to said combustion chamber for greater combustion promoting activation of the combustible mixture in said combustion chamber.

8. The piston assembly set forth in claim 7 wherein said orifices in said insert are arcuate in the plane containing the axis of said piston.

9. The piston assembly set forth in claim 7 wherein said central opening in said insert tapers outwardly from the top surface thereof toward said precombustion chamber.

No references cited.